(12) United States Patent
Zheng et al.

(10) Patent No.: US 8,731,335 B2
(45) Date of Patent: May 20, 2014

(54) METHOD AND APPARATUS FOR CORRECTING ROTATION OF VIDEO FRAMES

(75) Inventors: Yubao Zheng, Markham (CA); Philip L. Swan, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 238 days.

(21) Appl. No.: 13/304,929

(22) Filed: Nov. 28, 2011

(65) Prior Publication Data

US 2013/0136379 A1     May 30, 2013

(51) Int. Cl.
*G06K 9/32*     (2006.01)

(52) U.S. Cl.
USPC ........... 382/296; 382/274; 382/275; 382/277; 358/3.26; 358/3.27

(58) Field of Classification Search
USPC ......... 382/274, 275, 296, 277; 358/3.26, 3.27
See application file for complete search history.

(56) References Cited

U.S. PATENT DOCUMENTS

| | | | |
|---|---|---|---|
| 5,561,571 A * | 10/1996 | Kim | 360/271.9 |
| 5,567,050 A * | 10/1996 | Zlobinsky et al. | 366/209 |
| 6,256,061 B1 * | 7/2001 | Martin et al. | 348/222.1 |
| 6,778,699 B1 | 8/2004 | Gallagher | |
| 6,785,401 B2 * | 8/2004 | Walker et al. | 382/100 |
| 7,048,717 B1 * | 5/2006 | Frassica | 604/165.04 |
| 7,113,880 B1 * | 9/2006 | Rhea et al. | 702/117 |
| 7,436,411 B2 * | 10/2008 | Marshall et al. | 345/587 |
| 7,483,657 B2 * | 1/2009 | Ishida | 399/258 |
| 7,512,348 B2 * | 3/2009 | Suzuki et al. | 399/27 |
| 7,593,042 B2 * | 9/2009 | Cutler | 348/218.1 |
| 7,831,159 B2 * | 11/2010 | Ishida | 399/27 |
| 7,893,963 B2 | 2/2011 | Gallagher et al. | |
| 8,189,945 B2 * | 5/2012 | Stojancic et al. | 382/264 |
| 2011/0149096 A1 | 6/2011 | Matsuyama | |

FOREIGN PATENT DOCUMENTS

| | | |
|---|---|---|
| JP | 4419499 B2 | 2/2010 |
| JP | 2011176677 A | 9/2011 |

\* cited by examiner

*Primary Examiner* — Yosef Kassa
(74) *Attorney, Agent, or Firm* — Volpe and Koenig, P.C.

(57) ABSTRACT

A method and apparatus for correcting a rotation of a video frame are described. According to a method, an amount of the rotation of the video frame with respect to a reference is determined. The rotation of the video frame is corrected based at least in part on the detected amount of the rotation of the video frame.

22 Claims, 4 Drawing Sheets

METHOD AND APPARATUS FOR CORRECTING ROTATION OF VIDEO FRAMES

FIELD OF INVENTION

The present invention is generally directed to image processing and, more particularly, to correcting rotation of video frames.

BACKGROUND

A user of a video camera may be moving, have unsteady hands or hold the camera at one or more different angles while shooting a video. As a result, a recorded video may include one or more frames of the same scene that are rotated at different angles with respect to a reference (e.g., horizontal or vertical). The rotated frames may make the recorded video difficult to view or edit.

SUMMARY OF EMBODIMENTS

A method and apparatus for correcting a rotation of a video frame are described. According to a method, an amount of the rotation of the video frame with respect to a reference is determined. The rotation of the video frame is corrected based at least in part on the detected amount of the rotation of the video frame.

BRIEF DESCRIPTION OF THE DRAWINGS

A more detailed understanding may be had from the following description, given by way of example in conjunction with the accompanying drawings wherein.

DETAILED DESCRIPTION

Video editing software may enable a user to manually correct undesired rotation of video frames (e.g., frame by frame). Such manual correction may be tedious, particularly if many frames are rotated at various angles. Accordingly, embodiments described below may provide for automatic rotation correction of video frames. Additionally, embodiments provide for scene change detection, which may enable a rotation correction function to distinguish between rotation of a frame and a change of scene to prevent mis-identification of frames as being rotated upon scene change.

Figure 1:
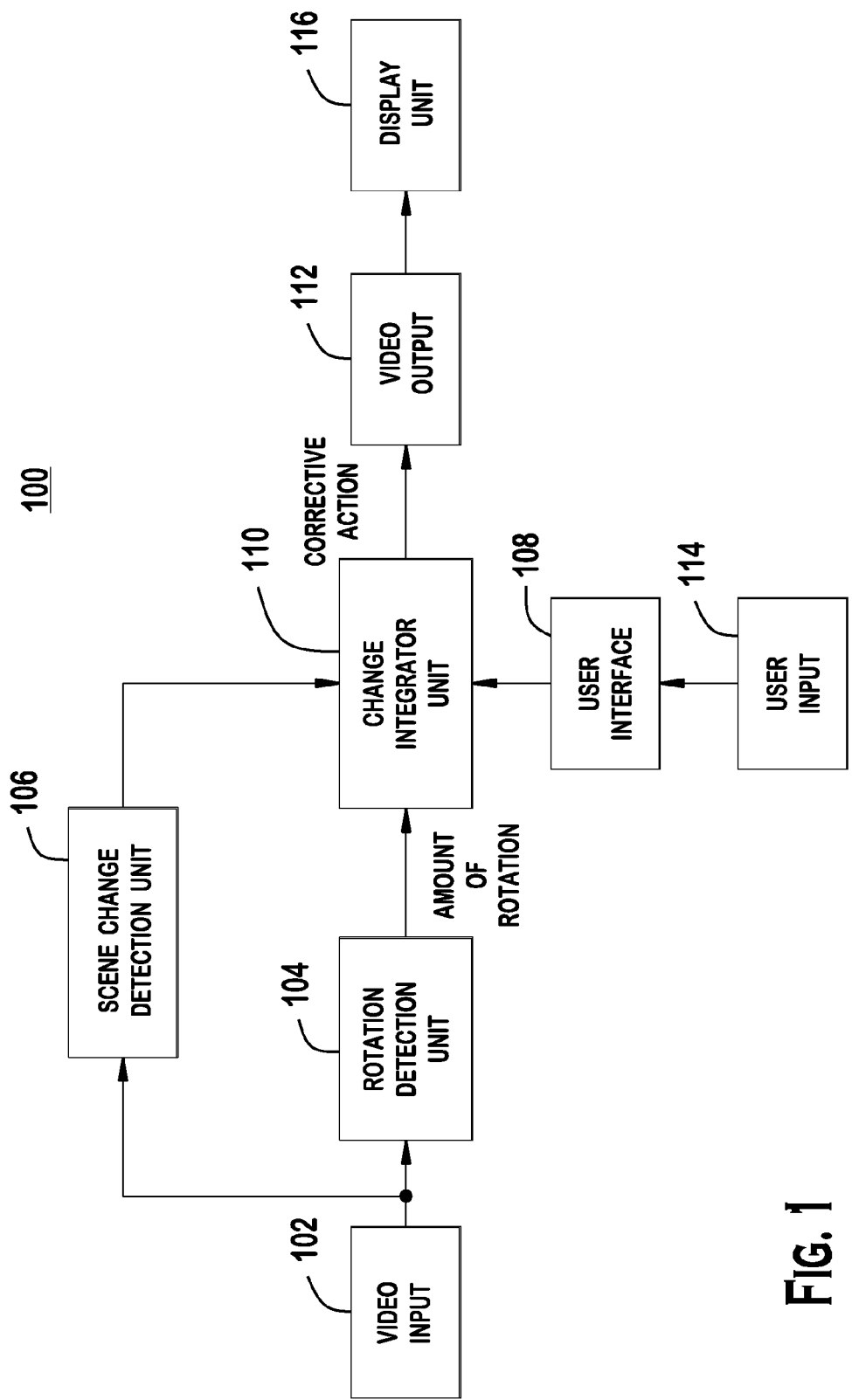
FIG. 1 is a block diagram of an embodiment of a system for correcting a rotation of a video frame.

FIG. 1 is a block diagram of an embodiment of a system 100 for correcting rotation of video frames. The illustrated system 100 includes a rotation detection unit 104, a scene change detection unit 106, a change integrator unit 110, a user interface 114 and a display unit 116. The illustrated system 100 may also be configured to receive a video input 102 and a user input 108 and provide a corrected video output 112 for display on the display unit 116. The individual elements included in the system 100 may all be included in a single apparatus or may be part of one or more separate apparatuses. By way of example, all of the elements may be implemented on a chip and an associated processor, multiple chips or in software or firmware (in whole or in part). By way of further example, the chip and associated processor, software, or firmware may further be included in one or more of a personal computer (PC), video camera, camera phone, camcorder, DVD player, etc.

The system 100 may also include a user interface 114 via which the user input 108 may be entered for consideration by the change integrator unit 110. The user interface 114 may be, for example, a graphical user interface, a manual user interface (including, for example, one or more buttons, switches, etc.) or a combination thereof. The user input 108 may include, for example, a number of degrees to rotate each frame in addition to any detected rotation. The number of degrees may be a custom number (e.g., 22 degrees, 37 degrees, etc.) or may be selected from a number of predetermined options (e.g., rotate each frame an additional 90 degrees, 180 degrees, 270 degrees, etc.) to compensate for, for example, a video captured in a landscape orientation. User input may also include enabling and disabling rotation correction functionality.

Figure 2:
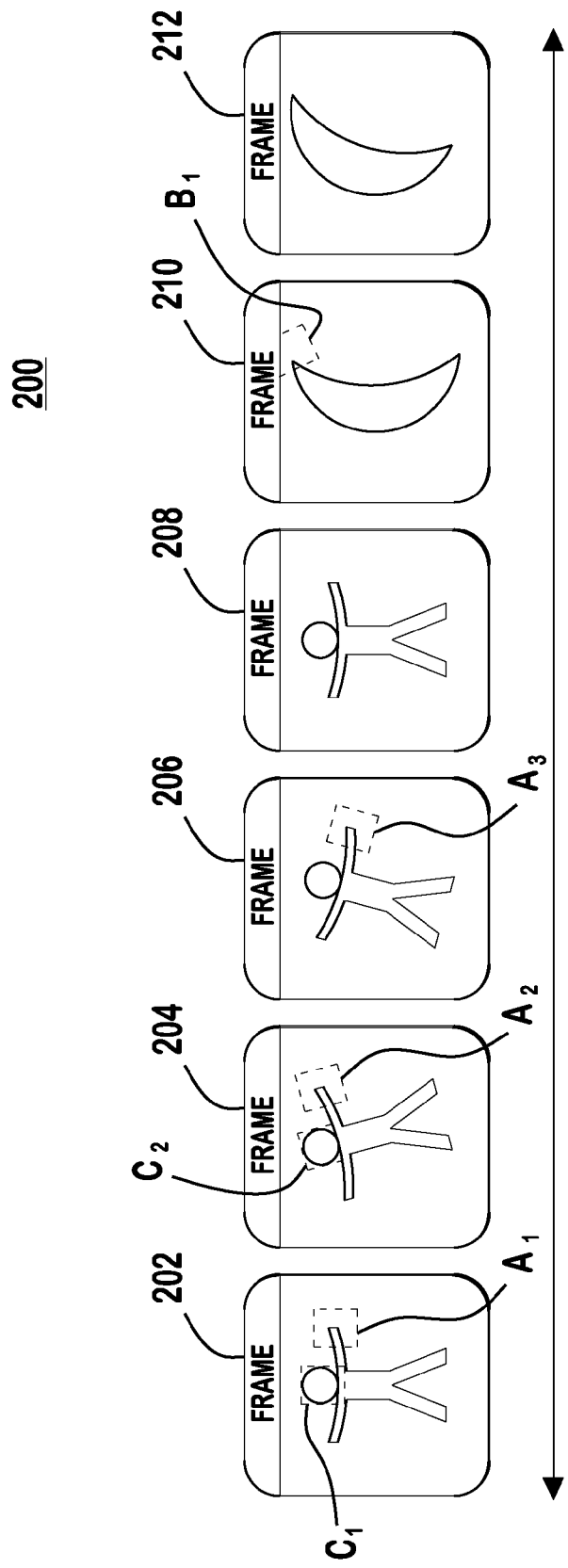
FIG. 2 is a diagram of an example video signal.

The rotation detection unit 104 may be configured to obtain the video input 102. By way of non-limiting example, the rotation detection unit 104 may receive or retrieve a video frame of a video signal from a video production, capture, reproduction and/or storage device such as a video camera, video camera phone, DVD player, PC or storage unit or apparatus. An example video signal 200 is illustrated in FIG. 2 and will be used as an example video input 102 in example embodiments that follow. The example video signal 200 includes frames 202, 204, 206, 208, 210 and 212, each of which may be obtained by the rotation detection unit 104 in succession.

Referring back to FIG. 1, the rotation detection unit 104 may analyze the video input 102 and determine an amount of rotation of any or all of the frames included in the video input 102. The amount of rotation of a frame may be determined relative to a reference (e.g., a reference frame such as a frame that was previously obtained from the video signal).

The scene change detection unit 106 may also obtain the video input 102. The scene change detection unit 106 may analyze the video input 102 and determine whether a scene has changed at a particular frame. The scene change detection unit 106 may use any scene change detection technique known in the art. By way of example, the scene change detection unit 106 may detect a scene change by performing a frame to frame comparison (e.g., using a histogram or edge detection approach). By way of another example, the scene change detection unit 106 may detect a scene change by analyzing a compressed video signal (e.g., analyzing motion vectors of a moving picture experts group (MPEG) signal).

The change integrator unit 110 may receive the amount of rotation for each frame from the rotation detection unit 104, any indication that the scene has changed at a particular frame and any user input 108 and determine whether and how much to correct the rotation of each frame based on the received information. If the change integrator unit 110 determines that correction of the rotation of a frame is necessary, the change integrator unit 110 may correct its rotation by the determined amount (e.g., corrective action) and provide the video output 112. In an embodiment, the change integrator unit 110 may compare the received amount of rotation of the frame with a threshold (e.g., 5 degrees) and determine not to correct the frame if the received amount of rotation is less than the threshold amount.

Figure 3:
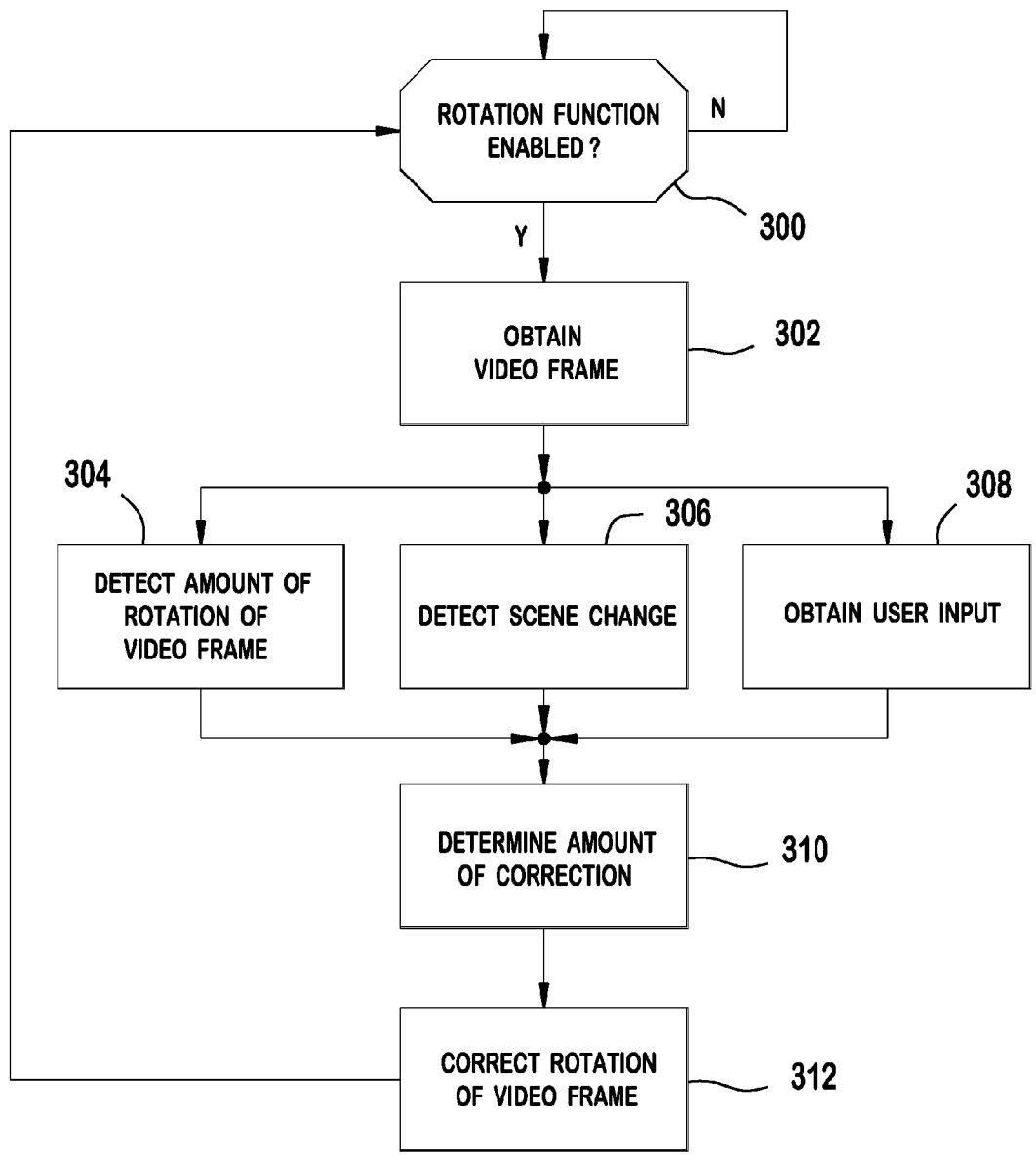
FIG. 3 is a flow diagram illustrating an example method of correcting a rotation of a video frame.

FIG. 3 is a flow diagram illustrating an example method of correcting a rotation of a video frame, which may be implemented, for example, by the system 100 of FIG. 1. According to the example method, it may be determined whether a rotation function is enabled (step 300). By way of example, a user may manually enable the rotation function by turning it on via the user interface 114, the rotation function may be automatically enabled when the system 100 (or one or more apparatuses including the system 100) is turned on or the rotation function may be automatically enabled in response to another function being enabled (e.g., when an apparatus enters a video playback or editing mode). If it is determined that the rotation function is not enabled, step 300 may be repeated until it is determined that the rotation function has been enabled or the system is turned off. The example method may be applied in real-time to a non-real-time video stream (e.g., real-time compensation of a pre-recorded video stream that is being played back) or to real-time (or near-real-time) video stream (e.g., real-time compensation of a real-time—not substantially pre-recorded—video stream such as those captured when a user is (pre)viewing or recording a live event) or in non-real-time.

If the rotation function is enabled (step 300), a video frame may be obtained (step 302). With respect to the signal 200 of FIG. 2, for example, the first frame 202 of the signal 200 may be obtained or any of the next successive frames 204, 206, 208, 210 and 212 may be obtained.

If a video frame is obtained (step 302), steps 304, 306 and 308 may occur. Steps 304, 306 and 308 are illustrated in FIG. 3 as occurring in parallel. However, these steps may occur at the same time or in any order.

An amount of rotation of the obtained video frame may be detected (step 304). As described with respect to FIG. 1 hereinbefore, a currently obtained frame may be compared to a previously obtained frame, and a difference in rotation between the two frames may be determined. By way of example, one or more regions of the currently obtained frame may be compared with one or more similar regions of the previously obtained frame. The amount of rotation change of the currently obtained frame with respect to the previously obtained frame may be detected by determining an amount of rotation of the one or more regions of the previously obtained frame with respect to the one or more similar regions of the currently obtained frame.

With respect to the example signal 200 of FIG. 2, frame 204 may be the currently obtained frame and frame 202 may be the previously obtained frame. Region $A_1$ of frame 202 and region $A_2$ of frame 204 may be compared, and the amount of rotation of the region $A_2$ with respect to the region $A_1$ may be determined to be, for example, −15 degrees (or +345 degrees). The amount of rotation change (e.g., −15 degrees or +345 degrees) may be provided to the change integrator unit 110 of FIG. 1. In a next iteration of the method, the frame 206 may be the currently obtained frame and the frame 204 may be the previously obtained frame. Region $A_3$ of frame 206 and region $A_2$ of frame 204 may be compared, and the amount of rotation of the region $A_3$ with respect to the region $A_2$ may be determined to be, for example, +22 degrees. The amount of rotation change (e.g., +22 degrees) may be provided to the change integrator unit 110 of FIG. 1.

In an embodiment, more than one region of the currently obtained frame may be compared with more than one region of the previously obtained frame (e.g., regions $A_2$ and $C_2$ of frame 204 may be compared with regions $A_1$ and $C_1$ of frame 202, respectively). Here, the rotation detection unit 104 of FIG. 1 may analyze the comparison results and provide a rotation amount that is based on the comparison results to the change integrator unit 110.

A scene change may be detected (step 306). With respect to the signal 200 of FIG. 2, for example, a scene change may be detected when frame 210 is the currently obtained frame. If a scene change is detected, the scene change detection unit 106 of FIG. 1 may signal this to the change integrator unit 110 of FIG. 1, as described above with respect to FIG. 1.

Any user input that has been entered (e.g., the user input 108 of FIG. 1) may be obtained (step 308). By way of example, a user input indicating an amount to rotate the video frame in addition to the detected rotation, may be obtained.

An amount to correct the rotation of the obtained video frame (if any) may be determined (step 310). The amount of correction may equal, for example, the sum of the amount of rotation detected in step 304 and any additional amount of rotation correction entered as user input 108 and obtained in step 308. If a scene change is detected in step 306, the amount of correction applied to the obtained video frame may not include the amount of rotation detected in step 304. In an embodiment, if a scene change is detected in step 306, the amount of correction may equal the additional amount of correction entered as user input and obtained in step 308 (if any). This may prevent a frame in which a scene change occurs from being over or under rotated due to the rotation detection unit 104 identifying, for example, a region of the frame 210 that is similar to regions $A_1$, $A_2$ and $A_3$ of frames 202, 204 and 306 (e.g., region $B_1$) and erroneously detecting rotation of the frame based on the rotation of the identified region. If no amount of rotation is detected in step 304 and no additional amount of rotation correction has been entered, it may be determined that no correction should be made to the frame.

The rotation of the currently obtained frame may be corrected by the determined amount (if any) (step 312) and step 300 may be repeated. The example method may be repeated until the rotation function is disabled or no more video frames are able to be obtained (e.g., a video is finished playback).

Figure 4A:
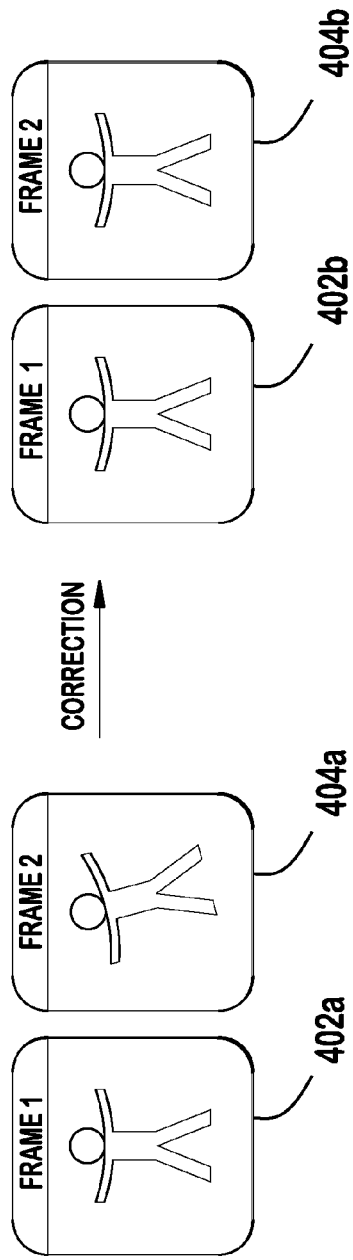
FIG. 4A is a diagram illustrating an example of a corrected frame.
Figure 4B:
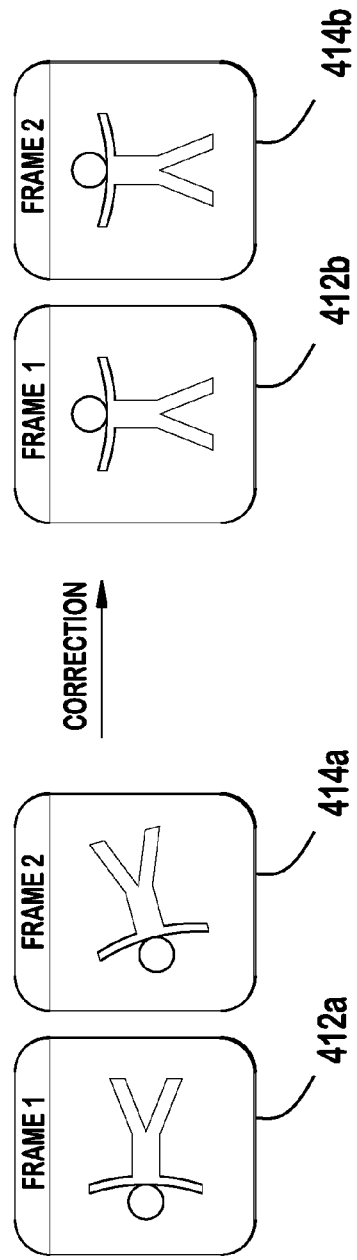
FIG. 4B is a diagram illustrating another example of a corrected frame.

Examples of corrected frames are illustrated in FIGS. 4A and 4B. The left hand sides of FIGS. 4A and 4B illustrate uncorrected frames 402a, 404a, 412a and 414a, which may be obtained by the rotation detection unit 104 in step 302. The right hand sides of FIGS. 4A and 4B illustrate corrected frames 402b, 404b, 412b and 414b, which may be provided as the output 112 from the change integrator unit 110 of FIG. 1. In FIG. 4A, the image captured in frame 404a is rotated with respect to the same image captured in frame 402a. The rotation of frame 404a is corrected by the detected number of degrees, as reflected by corrected frame 404b. In FIG. 4A, no additional degrees of rotation have been entered as user input 108. In FIG. 4B, the image captured in frame 414a is also rotated with respect to the image captured in frame 412a. However, in FIG. 4B, +90 degrees has been entered as additional degrees of rotation. Accordingly, a video captured with a video camera that was rotated −90 degrees (or +270 degrees) and includes frames that are rotated with respect to one another may be corrected so that the video may be displayed in a proper viewing orientation with all frames oriented the same. Thus, the embodiments described above may be used to correct frames that are rotated with respect to one another by any degree of rotation and may also be used to correct for a video camera that was intentionally rotated 90, 180 or 270 degrees during filming.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor.

Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture and test semiconductor devices (e.g., processors) that embody various aspects of the present invention.

What is claimed is:

1. A method of correcting a rotation of a video frame, the method comprising:
   detecting an amount of the rotation of a video frame with respect to a reference; and
   correcting the rotation of the video frame based at least in part on the detected amount of the rotation of the video frame, wherein the determined amount to correct the rotation of the video frame is any number of degrees of rotation between the reference and the obtained video frame.

2. The method of claim 1, wherein the obtained video frame is a currently obtained frame from a video signal that comprises a plurality of successive video frames.

3. The method of claim 2, wherein the reference is a video frame that was previously obtained from the video signal.

4. The method of claim 3, wherein the detected amount of the rotation is an amount of change in rotation from the video frame that was previously obtained from the video signal to the currently obtained frame from the video signal.

5. The method of claim 4, wherein the detecting comprises:
   comparing at least one region of the video frame that was previously obtained from the video signal with at least one similar region of the currently obtained frame from the video signal; and
   determining an amount of rotation between the at least one region of the video frame that was previously obtained from the video signal and the at least one similar region of the currently obtained frame from the video signal.

6. The method of claim 1, wherein:
   the method further comprises determining whether the video frame represents a scene change, and
   the determined amount to correct the rotation of the video frame is zero degrees if it is determined that the video frame represents the scene change.

7. The method of claim 1, wherein:
   the method further comprises receiving an additional amount to rotate the video frame, and
   determining the amount to correct the rotation of the video frame is based on the detected amount of the rotation of the video frame and the received additional amount to rotate the video frame.

8. The method of claim 7, wherein:
   the method further comprises determining whether the video frame represents a scene change, and
   if it is determined that the video frame represents the scene change, the determined amount to rotate the video frame is equal to the received additional amount to rotate the video frame.

9. The method of claim 7, wherein the additional amount to rotate the video frame is a specific number of degrees entered as user input.

10. The method of claim 7, wherein the additional amount to rotate the video frame is selected from a group of preset rotational degrees consisting of 90 degrees, 180 degrees and 270 degrees.

11. The method of claim 1, further comprising displaying the corrected video frame.

12. An apparatus comprising:
    a rotation detection unit configured to detect an amount of rotation of a video frame with respect to a reference; and
    a change integrator unit configured to correct the rotation of the video frame based at least in part on the detected amount of the rotation of the video frame, wherein the determined amount to correct the rotation of the video frame is any number of degrees of rotation between the reference and the obtained video frame.

13. The apparatus of claim 12, wherein the obtained video frame is a currently obtained frame from a video signal that comprises a plurality of successive video frames.

14. The apparatus of claim 13, wherein the reference is a video frame that was previously obtained from the video signal.

15. The apparatus of claim 14, wherein the detected amount of the rotation is an amount of change in rotation from the video frame that was previously obtained from the video signal to the currently obtained frame from the video signal.

16. The apparatus of claim 13, wherein the change integrator unit is further configured to receive an additional amount to rotate the video frame and determine the amount to correct the rotation of the video frame based on the detected amount of the rotation of the video frame and the received additional amount to rotate the video frame.

17. The apparatus of claim 16, wherein:
    the apparatus further comprises a scene change detection unit configured to determine whether the video frame represents a scene change, and
    the change integrator unit is further configured to determine the amount to correct the rotation of the video frame to be equal to the received additional amount to rotate the video frame if the scene change detection unit determines that the video frame represents the scene change.

18. The apparatus of claim 16, wherein the additional amount to rotate the video frame is a specific number of degrees entered as user input.

19. The apparatus of claim 16, wherein the additional amount to rotate the video frame is selected from a group of preset rotational degrees consisting of 90 degrees, 180 degrees and 270 degrees.

20. The apparatus of claim 12, wherein:
    the apparatus further comprises a scene change detection unit configured to determine whether the video frame represents a scene change, and
    the change integrator unit is further configured to determine the amount to correct the rotation of the video frame to be zero degrees if the scene change detection unit determines that the video frame represents the scene change.

21. The apparatus of claim 12, further comprising a display unit configured to display the corrected video frame.

22. A computer-readable storage medium storing a set of instructions for execution by a general purpose computer to correct a rotation of a video frame, the set of instructions comprising:
    obtaining a video frame;
    detecting an amount of rotation of the video frame with respect to a reference;
    determining an amount to correct the rotation of the video frame based at least in part on the detected amount of the rotation of the video frame; and
    correcting the rotation of the video frame by the determined amount, wherein the determined amount to correct the rotation of the video frame is any number of degrees of rotation between the reference and the obtained video frame.

\* \* \* \* \*